(12) United States Patent
Attia et al.

(10) Patent No.: US 7,287,696 B2
(45) Date of Patent: *Oct. 30, 2007

(54) SYSTEM AND METHOD FOR DECODING AND ANALYZING BARCODES USING A MOBILE DEVICE

(75) Inventors: Olivier Attia, New York, NY (US); Prateek Shrivastava, Newark, NJ (US); Roman Zastepine, Brooklyn, NY (US); Avi Chai Outmezguine, Brooklyn, NY (US)

(73) Assignee: Scanbuy, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/602,012

(22) Filed: Nov. 20, 2006

(65) Prior Publication Data

US 2007/0063050 A1   Mar. 22, 2007

Related U.S. Application Data

(63) Continuation of application No. 10/757,095, filed on Jan. 14, 2004, now Pat. No. 7,156,311.

(60) Provisional application No. 60/487,237, filed on Jul. 16, 2003.

(51) Int. Cl.
*G06K 7/10*   (2006.01)
(52) U.S. Cl. .................. 235/462.01; 235/462.24; 235/472.01; 235/462.46
(58) Field of Classification Search .......... 235/462.01, 235/462.24, 462.46, 472.01; 455/556.1, 455/556.2
See application file for complete search history.

(56) References Cited

U.S. PATENT DOCUMENTS

| | | |
|---|---|---|
| 4,238,768 A | 12/1980 | Mitsuya et al. |
| 4,323,973 A | 4/1982 | Greenfield |
| 4,554,593 A | 11/1985 | Fox et al. |
| 4,578,766 A | 3/1986 | Caddy |
| 4,692,603 A | 9/1987 | Brass et al. |
| 4,728,783 A | 3/1988 | Brass et al. |
| 4,754,127 A | 6/1988 | Brass et al. |
| 4,774,569 A | 9/1988 | Morton et al. |

(Continued)

FOREIGN PATENT DOCUMENTS

| | | |
|---|---|---|
| WO | WO-2005/020140 A2 | 3/2005 |
| WO | WO-2005/062234 A2 | 7/2005 |

OTHER PUBLICATIONS

Trier, O.D., Jain, A.K., "Goal-Directed Evaluation of Binarization Methods", Pattern Analysis and Machine Intelligence, IEEE Transactions on, Dec. 1995, ISSN: 0162-8828.

(Continued)

*Primary Examiner*—Steven S. Paik
(74) *Attorney, Agent, or Firm*—Wilmer Cutler Pickering Hale and Dorr LLP

(57) ABSTRACT

The present invention discloses a system and method for decoding barcodes using mobile device. Generally, the barcode image is acquired via a digital camera attached to the mobile device. After the barcode image has been acquired, software located on the mobile device enhances the barcode image and subsequently decodes the barcode information. The barcode information is then transmitted to a server via a wireless network. The server processes the barcode information and transmits media content related to the barcode back to the mobile device.

33 Claims, 11 Drawing Sheets

U.S. PATENT DOCUMENTS

| | | | |
|---|---|---|---|
| 4,782,221 A | 11/1988 | Brass et al. | |
| 4,874,936 A | 10/1989 | Chandler et al. | |
| 4,896,029 A | 1/1990 | Chandler et al. | |
| 4,969,202 A | 11/1990 | Groezinger | |
| 4,998,010 A | 3/1991 | Chandler et al. | |
| 5,016,118 A | 5/1991 | Nannichi et al. | |
| 5,103,490 A | 4/1992 | McMillin | |
| 5,113,454 A | 5/1992 | Marcantonio et al. | |
| 5,153,418 A | 10/1992 | Batterman et al. | |
| 5,179,599 A | 1/1993 | Formanek | |
| 5,189,292 A | 2/1993 | Batterman et al. | |
| 5,223,701 A | 6/1993 | Batterman et al. | |
| 5,235,172 A | 8/1993 | Oehlmann et al. | |
| 5,243,443 A | 9/1993 | Eschbach | |
| 5,243,444 A | 9/1993 | Fan | |
| 5,243,655 A | 9/1993 | Wang | |
| 5,276,315 A | 1/1994 | Surka | |
| 5,327,240 A | 7/1994 | Golston et al. | |
| 5,331,442 A | 7/1994 | Sorimachi | |
| 5,345,317 A | 9/1994 | Katsuno et al. | |
| 5,510,604 A | 4/1996 | England | |
| 5,621,203 A | 4/1997 | Swartz et al. | |
| 5,691,773 A | 11/1997 | Wang et al. | |
| 5,767,978 A | 6/1998 | Revankar et al. | |
| 5,778,092 A | 7/1998 | MacLeod et al. | |
| 5,783,811 A | 7/1998 | Feng et al. | |
| 5,811,781 A | 9/1998 | Ackley | |
| 5,852,677 A * | 12/1998 | Nakamura et al. | 382/173 |
| 5,862,270 A | 1/1999 | Lopresti et al. | |
| 5,877,486 A | 3/1999 | Maltsev et al. | |
| 5,890,021 A | 3/1999 | Onoda et al. | |
| 5,909,505 A | 6/1999 | Katayama et al. | |
| 5,915,039 A | 6/1999 | Lorie et al. | |
| 5,963,669 A | 10/1999 | Wesolkowski et al. | |
| 5,969,325 A | 10/1999 | Hecht et al. | |
| 6,045,515 A | 4/2000 | Lawton | |
| 6,082,619 A | 7/2000 | Ma et al. | |
| 6,091,511 A * | 7/2000 | Ben Dror et al. | 358/1.9 |
| 6,101,285 A | 8/2000 | Fan | |
| 6,115,488 A | 9/2000 | Rogers et al. | |
| 6,115,508 A | 9/2000 | Lopresti et al. | |
| 6,137,898 A | 10/2000 | Broussard et al. | |
| 6,201,612 B1 | 3/2001 | Matsushiro et al. | |
| 6,201,901 B1 | 3/2001 | Zhou et al. | |
| 6,282,307 B1 | 8/2001 | Armato, III et al. | |
| 6,347,156 B1 | 2/2002 | Kamada et al. | |
| 6,366,696 B1 | 4/2002 | Hertz et al. | |
| 6,371,373 B1 | 4/2002 | Ma et al. | |
| 6,418,244 B2 | 7/2002 | Zhou et al. | |
| 6,431,452 B2 | 8/2002 | Feng | |
| 6,446,868 B1 | 9/2002 | Robertson et al. | |
| 6,512,919 B2 * | 1/2003 | Ogasawara | 455/422.1 |
| 6,565,003 B1 | 5/2003 | Ma | |
| 6,585,157 B2 | 7/2003 | Brandt et al. | |
| 6,604,682 B2 | 8/2003 | Wakamiya et al. | |
| 6,631,012 B2 | 10/2003 | Athens et al. | |
| 6,631,843 B2 | 10/2003 | Schuessler | |
| 6,650,766 B1 | 11/2003 | Rogers et al. | |
| 6,674,919 B1 | 1/2004 | Ma et al. | |
| 6,735,341 B1 | 5/2004 | Horie et al. | |
| 6,735,745 B2 | 5/2004 | Sarig et al. | |
| 6,752,317 B2 | 6/2004 | Dymetman et al. | |
| 6,802,450 B2 | 10/2004 | Cheung et al. | |
| 6,832,729 B1 | 12/2004 | Perry et al. | |
| 6,837,432 B2 | 1/2005 | Tsikos et al. | |
| 6,898,329 B1 | 5/2005 | Takahashi et al. | |
| 7,156,311 B2 * | 1/2007 | Attia et al. | 235/462.46 |
| 2001/0041581 A1 | 11/2001 | Hansson | |
| 2002/0071076 A1 | 6/2002 | Webb et al. | |
| 2002/0084330 A1 | 7/2002 | Chiu | |
| 2002/0090107 A1 | 7/2002 | Acharya et al. | |
| 2002/0102966 A1 | 8/2002 | Lev et al. | |
| 2002/0187774 A1 | 12/2002 | Ritter et al. | |
| 2003/0007696 A1 | 1/2003 | Saito | |
| 2003/0055675 A1 | 3/2003 | Klein Twennaar | |
| 2003/0074286 A1 | 4/2003 | Rodrigo | |
| 2003/0123710 A1 | 7/2003 | Nakazawa et al. | |
| 2004/0042670 A1 | 3/2004 | Moroo et al. | |
| 2004/0101183 A1 | 5/2004 | Mullick et al. | |
| 2004/0240737 A1 | 12/2004 | Lim et al. | |
| 2005/0035206 A1 | 2/2005 | Attia et al. | |
| 2005/0121521 A1 | 6/2005 | Ghai et al. | |
| 2005/0198095 A1 | 9/2005 | Du et al. | |

OTHER PUBLICATIONS

Heckbert, Paul S., "Fundamentals of Texture Mapping and Image Warping," Department of Electrical Engineering and Computer Science, University of California, Master's Thesis, 1989.

Lew, Michael S., "Prinicples of Visual Information Retrieval," State of the Art in Shape Matching, 2001, pp. 87-119.

Tsai, Roger Y., "A Versatile Camera Calibration Tedhnique for High-Accuracy 3D Maching Vision metrology Using Off-the-Shelf TV Cameras and Lenses," IEEE Journal of Robotics and Automation, 1987, RA-3(4):323-344.

Wellner, Pierre D., "Adaptive Thresholding for the DigitalDesk," EuroPARC Technical Report EPC-93-110, 1993, pp. 1-17.

Bottller, Stefan, "SMS-Flaschenpost erreicht Millionen," W&V Wochenmagazin Fur Marketing, Werbung, Medien und E-Business, Nov. 28, 2003, pp. 44-45.

Rohs, Michael et al., "Entry Points into a Smart Campus Environment - Overview of the ETHOC System," Institute for Pervasive Computing Swiss Federal Institute of Technology, ICDCS 2003 Workshops, May 2003.

* cited by examiner

SYSTEM AND METHOD FOR DECODING AND ANALYZING BARCODES USING A MOBILE DEVICE

PARENT CASE TEXT

This application is a continuation of U.S. patent application Ser. No. 10/757,095, filed Jan. 14, 2004, now U.S. Pat. No. 7,156,311 which is hereby incorporated by reference herein in its entirety. This application also claims the benefit of U.S. Provisional Patent Application No. 60/487,237, filed Jul. 16, 2003.

FIELD OF THE INVENTION

The present invention relates generally to the field of barcode scanning and decoding using a mobile device. More specifically, the present invention uses optical decoding techniques to decode barcodes acquired via a camera phone or other similarly equipped device.

BACKGROUND OF THE INVENTION

Barcodes have been utilized for identifying and pricing objects for more than thirty years. Most typically, barcodes are used in retail to identify the item of merchandise. For example, a gallon of milk may contain a barcode that, when scanned, will notify the cashier of the price of the milk.

Yet in recent years, barcodes have acquired new purposes as computers and barcode scanners have become more portable. The circuitry required to scan a conventional one-dimensional barcode can now be housed in a device as small as a typical keychain. As a result, many mobile telephones, personal digital assistants ("PDAs"), and pagers can be retrofitted with or connected to a laser-based scanning device. This allows the mobile device to function as a scanner capable of storing hundreds or thousands of scanned barcodes.

Mobile devices with attached scanners have allowed for the development of a new niche in the wireless electronics business. Some companies have developed software and hardware which allows a user to scan any barcode and be redirected to media information (e.g., a website, product description, price, etc.) about the scanned product. These programs provide a link between the physical and online world which previously did not exist.

However, mobile devices with attached scanners possess some drawbacks which have curtailed their expansion into the mobile marketplace. First, there are few mobile devices produced for the general public that contain integrated laser-based scanners. Therefore, for a user to acquire scanning capability for a mobile device, he/she must purchase additional equipment. The additional scanning equipment also adds size and weight to the mobile device, thereby reducing its mobility.

Currently, many cell phones and mobile devices are available with built-in cameras. The explosion of the availability of affordable digital cameras and their inclusion into mobile devices is driven by several factors. One of the most important is the recent availability of inexpensive image sensors based on CMOS technology. The cameras on these devices provide a means for capturing the barcode information which was previously only accessible via a laser-based scanner. Decoding barcode images from digital cameras included in mobile devices presents several difficult problems. These problems go well beyond the challenges addressed in commercial barcode readers. Barcode decoding algorithms from commercial products will not consistently decode images from a consumer portable device. Some of these problems are addressed below:

Lighting:

Most mobile devices with integrated digital cameras do not have built-in flashes and rely solely on the ambient light for illumination. Using highly variable ambient light makes pattern recognition much more difficult. Shadows, shading across the length of a barcode, overexposure, underexposure, and similar problems that are typical of any camera not utilizing a flash can foil traditional barcode decoding algorithms that are designed for highly controlled lighting environments.

Size:

The distance between a digital camera and its target object is not usually rigidly controlled. This translates into a large range of possible sizes (magnifications) that a barcode can have on a fixed size image sensor.

Skew:

As any photographer knows, taking pictures at an angle changes the apparent shape of the object to a viewer. A barcode with a rectangular shape, when viewed straight-on, can look like a trapezoid (or irregular quadrilateral) when viewed from an angle. The location and addressing of image pixels for a barcode change dramatically when viewed from the side, or tilted. Algorithms to decode barcodes from digital images must be able to address images distorted from skewed viewing angles, but must do so within the constraints of limited hardware, processing power, and memory typically found in mobile devices such as PDAs and handsets.

Battery Power:

Portable devices run on batteries—the smaller the better. Barcode decoding algorithms for cameras must be very efficient so as to use low amounts of CPU power. Charge coupled diode ("CCD") devices and barcode scanners using laser light generally require a large amount of power, and are not well suited for battery powered, handheld devices.

Color Imagers:

Consumer oriented devices such as mobile handsets generally are designed with color image sensors. However, barcode scanning typically operates best with gray-scale information. Color data typically requires three times the amount of storage and handling required by gray-scale. Data needs to be transferred through the camera's CPU and memory to be processed. For color imagers, specific image processing algorithms are required in order to avoid problematic image artifacts during the translation from color to grayscale.

Focus:

Digital cameras for portable devices are usually designed to work at a variety of distances. The need for a wider range of focus in cameras results in a trade off between the cost of the lens component and the sharpness of a typical image. Decoding algorithms for embedded digital cameras must be able to cope with a moderate degree of focus problems.

Low-Cost Lens Components:

In order to meet cost constraints of many portable device markets, manufacturers often compromise on the optical quality of camera lenses. This can present decoding technology with a different set of challenges from the simple focal length based focus problem noted above. Low-cost lens components can produce image distortions that are localized to a specific region or form a changing gradient across the image. This requires additional sophistication for decoding algorithms.

Limited Resolution:

The cost of a digital imaging CMOS sensor increases as the number of image pixels increases. Although the Asian market has seen the release of general purpose consumer devices like PDAs and cell phones with "megapixel" image resolution, it is unlikely these devices will be released in the mainstream European and North American markets in the near future. With fewer pixels to work with, it is significantly more difficult to reliably decode barcodes from images.

Based on the aforementioned described problems with mobile digital imaging, there clearly exists a need for a system capable of capturing, decoding, and analyzing barcode information obtained from a digital camera enabled mobile device. Such a system would enable the average mobile device user to accurately and reliably scan and decode any barcode available.

SUMMARY OF THE INVENTION

The present invention provides a software application and system (hereinafter referred to as "ScanZoom") designed to successfully process and decode barcodes acquired via digital imaging techniques. ScanZoom software empowers a user to use a cell-phone or PDA equipped with a digital camera as a scanner of barcodes (one-dimensional and two-dimensional) or any other similar machine-readable code. It seamlessly integrates the barcode scanning technology with the digital camera (built-in or attached) of the cell phones/PDAs/Pocket PCs.

To utilize the ScanZoom software, a user downloads the ScanZoom onto his/her cell phone or PDA through wireless access protocol ("WAP"), infrared, or Bluetooth® connectivity. However, any protocol which allows a user to download a program to a mobile device may be utilized to download ScanZoom. Once the user has downloaded ScanZoom, the user launches the application. This causes ScanZoom to properly initialize the digital camera coupled to the mobile device to accept input. It starts the digital camera by calling its Application identification.

The user then takes a picture of the barcode using the digital camera. As soon as the barcode is captured, the ScanZoom software decodes the barcode utilizing a decoding engine integral to the ScanZoom software. Alternatively, the ScanZoom software may send the image of the barcode to a central server for decoding by sending a multimedia message service ("MMS") message to the server containing the barcode image.

If ScanZoom sends a MMS message to the server, it launches the MMS Application Id, composes the appropriate message on the fly, and then sends the message to the SMS/MMS server. On the server side, a global system for mobile communications ("GSM") modem connected to the server has the appropriate security identity module ("SIM") card and takes the services from any mobile service provider. The server fetches the MMS message from the GSM modem queue and performs appropriate action depending upon the message. The server can then send back a simple SMS message or can send back a multimedia message service ("MMS") message which can launch a WAP browser on the mobile device and direct it to the appropriate website, or send back information to the user through any other existing wireless protocol.

The location of the decoding depends entirely upon the processing capabilities of the mobile device utilized. For example, if the ScanZoom software is operating on a mobile device with lower system capabilities, such as a first generation camera phone, the mobile device will automatically send the digital image of the barcode to a server for decoding.

The barcode decoding engine continuously runs in a loop until it's able to decode the image taken by the digital camera into a barcode. If the barcode cannot be properly resolved, the user is prompted to take another picture of the desired barcode.

Additionally, the barcode decoding may also be performed in real time. The ScanZoom software accomplishes this by constantly capturing and processing the image of the barcode until it is correctly decoded. This eliminates the extra step of the user having to press a button to capture an image of the barcode.

After the barcode has been correctly resolved either by the mobile device or the server, the mobile device displays the appropriate media content to the user. The media content displayed to the user depends entirely on the barcode scanned. For example, if a user scans a barcode on a compact disc, the ScanZoom application may launch a WAP browser and direct the user to a site which allows the user to purchase the compact disc electronically. As another example, if a user scans a barcode located on a food item, the server may return a SMS message to the mobile device indicating the nutritional contents of the scanned item.

Therefore, it is an object of the present invention to provide a software application and system capable of accurately and reliably decoding barcodes and other machine-readable codes acquired via a digital camera connected to a mobile device.

Another object of the present invention is to provide a software application and system which allows for the decoding of barcodes in a wide range of conditions.

An additional object of the present invention is to provide a software application and system for decoding barcodes which is quick and responsive.

Yet another object of the present invention is to provide a software application and system for decoding barcodes which is robust under adverse lighting, imaging, and focusing conditions.

Still another object of the present invention is to provide a software application and system for decoding multiple barcode formats.

Another object of the present invention is to provide a software application and system which does not adversely affect device performance, usability, or form factor.

Furthermore, an object of the present invention is to provide a software application and system for decoding barcodes which does not significantly impact device power consumption nor degrade general camera performance.

It is another object of the present invention to provide a barcode decoding system which requires minimal or no changes to the manufacturing process of the mobile devices.

An additional object of the present invention is to provide a barcode decoding system having a low incremental cost per device.

Another object of the present invention is to provide a highly reliable barcode decoding system requiring minimal user support.

These and other objects of the present will be made clearer with reference to the following detailed description and accompanying drawings.

DETAILED DESCRIPTION OF THE PREFERRED EMBODIMENT(S)

The following presents a detailed description of a preferred embodiment (as well as some alternative embodiments) of the present invention. However, it should be apparent to one skilled in the art that the described embodiment may be modified in form and content to be optimized for a wide variety of situations.

Figure 1:
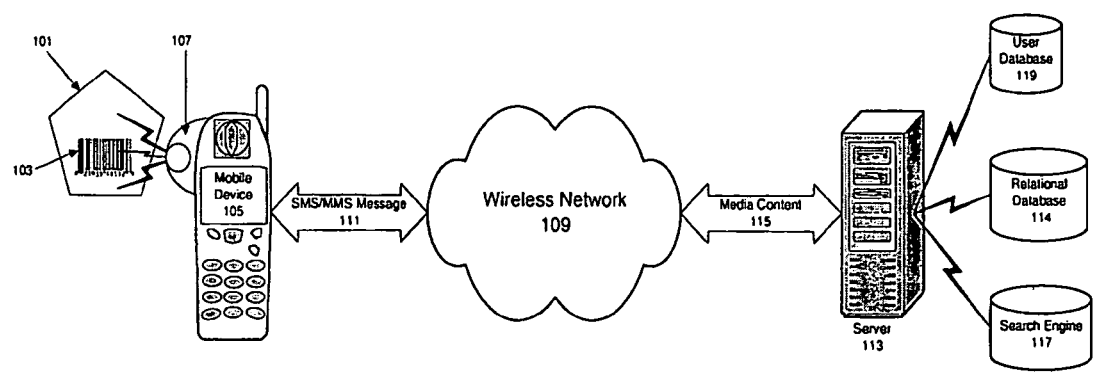
FIG. 1 depicts a schematic diagram of the network configuration utilized in the preferred embodiment of the invention.

With reference first to FIG. 1, shown is a schematic diagram of the network configuration utilized in the preferred embodiment of the present invention. In this figure, product 101 contains barcode 103 which may be placed on product 101 in a variety of ways. For example, barcode 103 may be printed directly onto product 101 utilizing conventional printing techniques. Alternatively, barcode 103 may be affixed to product 101 utilizing a sticker, tag, etc.

Barcode 103 may be any machine-readable code utilizing either a public standard encoding symbology or a proprietary symbology. Some examples of one and two dimensional symbologies include, but are not limited to, UPC-A, UPC-E, ISBN, RSS-14, RSS-14E, RSS-14L, Interleaved 2 of 5, EAN/JAN-8, EAN/JAN-13, Code 39, Code 39 Full ASCII, Code 128, PDF417, QR Code, Data Matrix, and Optical Intelligence 2D.

To scan barcode 103, a user utilizes mobile device 105 with attached or embedded digital camera 107. The user first launches the ScanZoom application on mobile device 105. If the ScanZoom software has not yet been loaded onto mobile device 105, a user may do so by downloading the program via WAP, Bluetooth, or infrared connectivity.

Mobile device 105 may be any device capable of digitally imaging barcode 103 such as a camera phone, mobile phone with camera attachment, PDA, PDA with camera attachment, Pocket PC, Palm device, laptop, desktop, etc.

Once an image of barcode 103 has been acquired by mobile device 105, the ScanZoom software loaded on mobile device 105 decodes the barcode directly utilizing mobile device 105's internal circuitry. The ScanZoom software can be ported to most any mobile device operating system including, but not limited to, Symbian OS, Palm OS, Windows CE, Windows Mobile, and SmartPhone. The decoded barcode information is then sent to wireless network 109 via SMS/MMS message 111. Wireless network 109 routes SMS/MMS message 111 to the appropriate server 113. Server 113 then processes the received barcode information and relays the appropriate media content 115 to mobile device 105 via wireless network 109.

Alternatively, mobile device 105 may not process the barcode image at all. In this situation, mobile device 105 would send the entire barcode image to server 113 via MMS message 111. ScanZoom software loaded onto server 113 would be responsible for correctly decoding g barcode 103.

Yet in another embodiment, mobile device may scan barcode 103 in real time, thereby eliminating the step of capturing a photo of the barcode. In this embodiment, the ScanZoom software located on mobile device 105 constantly acquires images of barcode 103 and stores them in memory. Each of these images is subsequently processed until the barcode is correctly decoded. Once barcode 103 has been decoded, mobile device 105 stops acquiring images of barcode 103.

Server 113 may process SMS/MMS message 111 in many different ways. In a first embodiment, server 113 may use relational database 114 to pull up product information pertaining to product 101. The server would then forward the product information to mobile device 105 via a SMS/MMS message. If a MMS message is sent to mobile device 105, this may cause a WAP browser loaded on mobile device 105 to be redirected to the appropriate site.

In a second embodiment, server 113 may process SMS/MMS message 111 by using relational database 114 to pull up product information related to product 101 and then utilize search engine 117 to search for similar products or information pertaining to it. The results of the search would then be sent to mobile device 105 via a SMS/MMS message. As should be evident from these two described embodiments, the barcode information can be utilized in an almost limitless amount of ways.

To provide additional security, a user of mobile device 105 may be prompted to provide a username and/or password to access server 113. Server 113 would use user database 119 to properly authenticate users. Users not having an account contained in user database 119 would not be granted access to server 113 in any capacity.

Figure 2A:
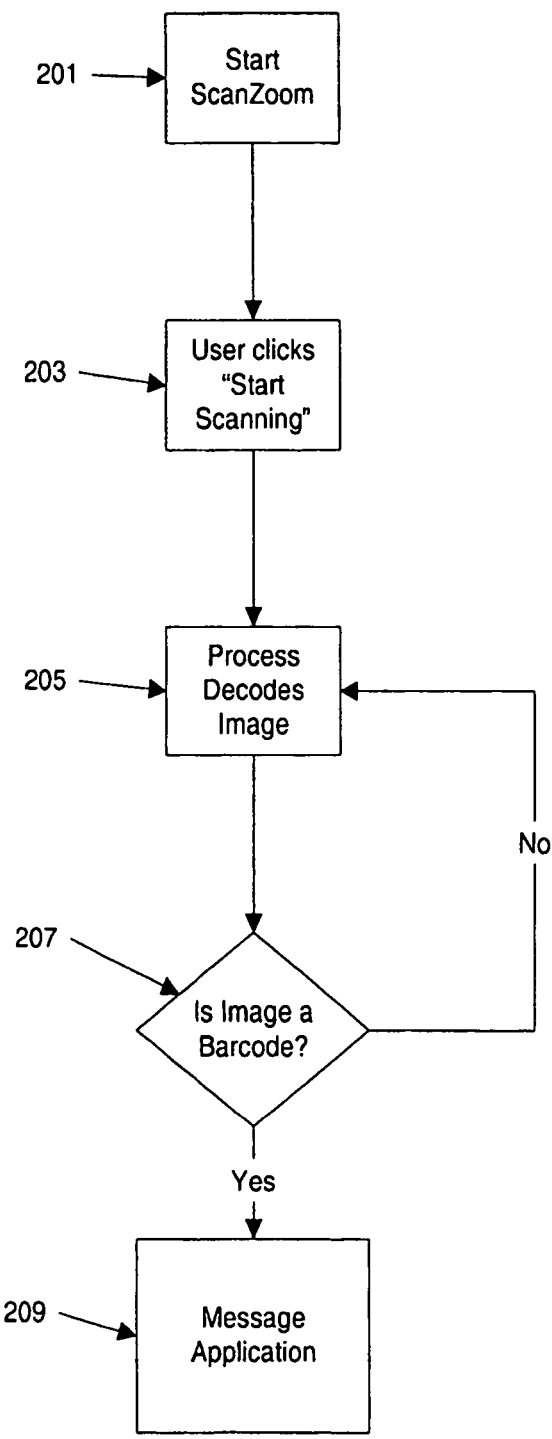
FIG. 2A depicts a flowchart showing the steps the ScanZoom software utilizes to image and decode a barcode.

Referring next to FIG. 2A, shown is the process utilized by ScanZoom to acquire and decode barcode 103 once the application has been launched. A user first launches the ScanZoom program on mobile device 105 by selecting its icon from a list of programs located on the device in step 201. Generally, this will initialize the camera and all the network resources needed by ScanZoom for the application to function properly. Once the user has started the program, a message appears directing the user to take a picture of barcode 103 in step 203. ScanZoom provides the user with a "preview" window which functions as a viewfinder, allowing the user to properly center and align the barcode before taking a picture. Once the barcode image has been acquired by digital camera 107, ScanZoom attempts to decode the barcode utilizing its proprietary barcode decoding algorithm in step 205. If the software cannot decode barcode 103 on a first attempt in step 205, the ScanZoom software attempts to decode the image a finite amount of times. The number of decoding attempts can either be fixed or able to be altered by the user. Once barcode 103 has been properly decoded as verified in step 207, mobile device 105 prepares the decoded information for transfer to server 113 to undergo further processing in step 209.

Figure 2B:
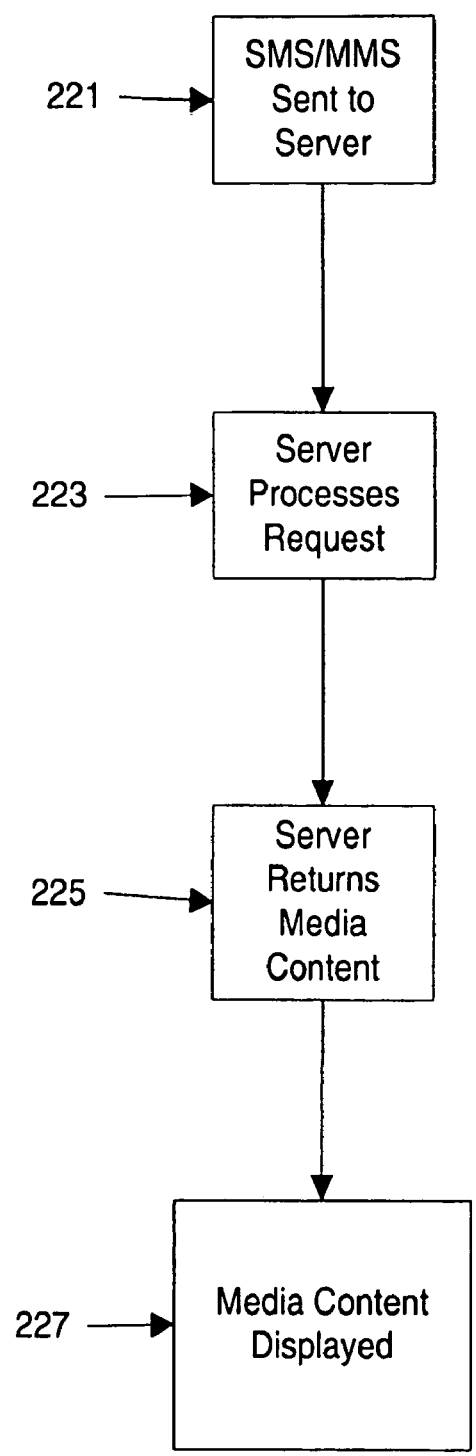
FIG. 2B depicts a flowchart that the ScanZoom software utilizes if MMS messaging is utilized to transmit the captured barcode.

FIG. 2B depicts the process utilized by the ScanZoom software if the decoded barcode information is sent to server 113 via SMS/MMS message 111. In this scenario, mobile device 105 first encodes the decoded barcode information into SMS/MMS message 111 in step 221. SMS/MMS message 111 is then processed by server 113 in step 223. As previously discussed with respect to FIG. 1, server 113 may utilize any combination of relational database 114, search engine 117, or user database 119 to process the barcode information. Once the barcode has been processed in step 223, server 113 sends the resulting media content 115 back to mobile device 105 in step 225. Media content 115 is then displayed on the screen of mobile device 105 in step 227.

Figure 2C:
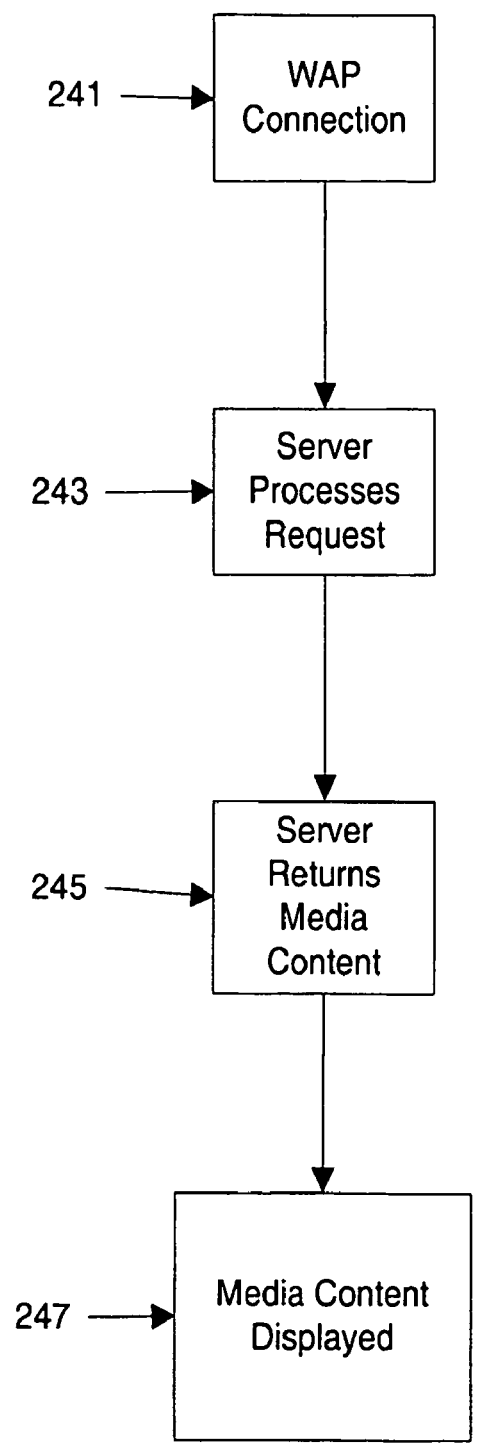
FIG. 2C depicts a flowchart that the ScanZoom software utilizes if WAP messaging is utilized to transmit the scanned barcode.

Alternatively, if a WAP connection is utilized to send the barcode information to server 113 via wireless network 109, the process depicted in FIG. 2C is utilized. First, mobile device 105 conditions the barcode information for transfer via WAP in step 241. Once the barcode information arrives at server 113, the barcode information is depacketized and processed by server 113 in step 243. Once the barcode has been processed in step 243, server 113 sends the resulting media content 115 back to mobile device 105 in step 245. Media content 115 then causes the proper site to be displayed on the screen of mobile device 105 in step 247.

Figure 3A:
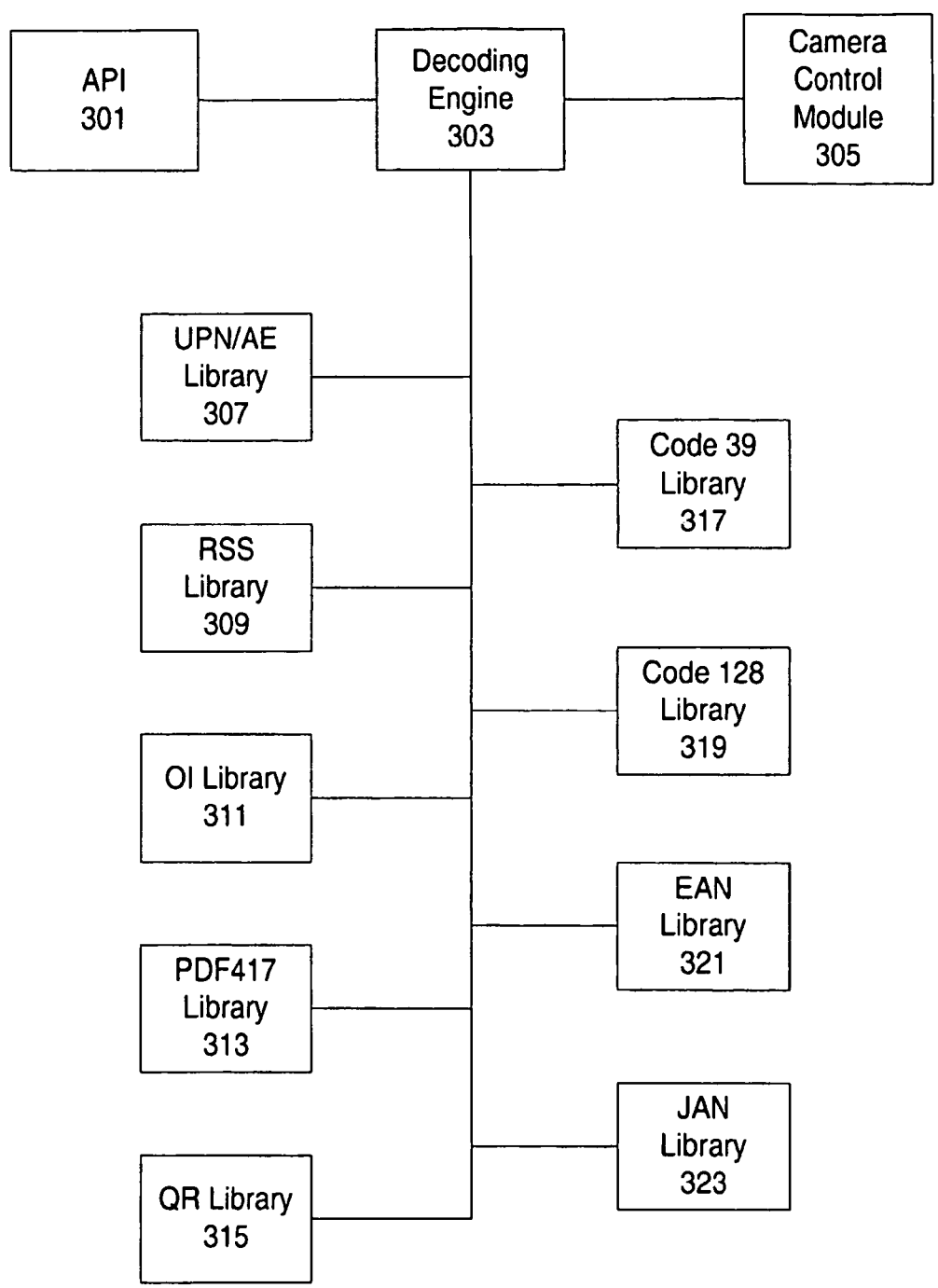
FIG. 3A depicts a schematic diagram showing the product architecture of the ScanZoom software application.

Turning next to FIG. 3A, shown is a schematic diagram depicting the product architecture of the ScanZoom software. The ScanZoom software is composed of three main modules: the application program interface ("API") 301, decoding engine 303, and camera control module 305. API 301 is the interface which the user utilizes to interact with the ScanZoom software. API 301 guides the user through all the steps required to decode and process barcode 103.

Figure 3B:
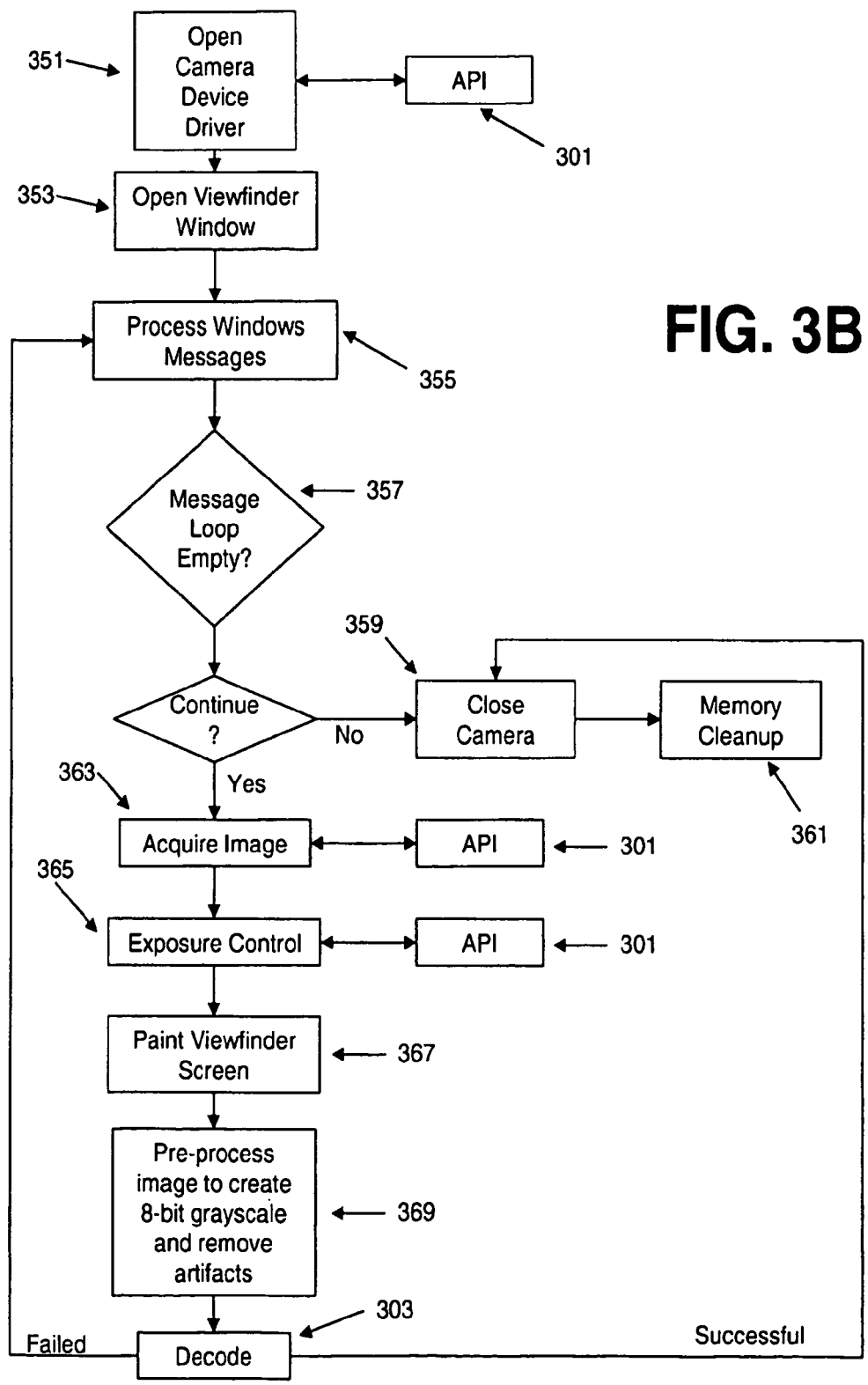
FIG. 3B depicts a flowchart showing the steps utilized by ScanZoom to acquire the barcode image and prepare it for decoding.

The steps utilized to acquire the barcode image and prepare it for decoding are shown in greater detail in FIG. 3B. As shown, API 301 first directs camera control module 305 to initialize the application ID for digital camera 107 in step 351. This sets up digital camera 107 to accept input. Next, API 301 causes a "viewfinder" window to open on mobile device 105's display in step 353. This allows the user to make sure that barcode 103 is in proper focus and amply illuminated.

API 301 next processes the windows messages in step 355. Windows messages are messages from the camera that interrupt the ScanZoom program if certain events have occurred. For example, a windows message may indicate that a new SMS message has been received or there is an incoming telephone call. Once the windows messages have been properly processed, API 301 checks to see if the windows message loop is empty in step 357. If the windows message loop is not empty, camera control module 305 closes digital camera 107s application ID in step 359. All message and pictures are then cleared from the camera's active memory in step 361.

However, if the windows message loop is empty, the user is then directed to push a button on mobile device 105 to take an image of barcode 103 in step 363. Alternatively, the image may be acquired automatically by mobile device 105 for "on-the-fly" decoding. Camera control module 305 interacts directly with API 301 to perform this step since the user must physically push a button on mobile device 105 to take the image. Alternatively, this feature may be fully automated.

Once the image of barcode 103 has been acquired and stored in memory, the image undergoes exposure control in step 365 to correctly compensate for the illumination. More specifically, this step correctly adjusts camera features such as the shutter speed. For example, if the ambient light is low, exposure compensation step 365 may compensate for this by increasing the shutter speed.

At this point in the image acquisition process, the acquired image is displayed to the user for review in step 367. If the user chooses to accept the acquired image, camera control module 305 next converts the image to an eight-bit grayscale image in step 369. Camera control module 305 additionally removes artifacts from the image which are typical of digital images. The artifacts are removed using pattern recognition because barcodes have definite shapes and alien features may be easily eliminated using pattern recognition.

The processed image is then passed to decoding engine 303 for decoding. If the decoding is not successful, API 301 returns the user to step 355 so that a new image can be acquired. However, if decoding is successful, API 301 closes the camera in step 359 and clears the camera's memory in step 361.

Now referring back to FIG. 3A, decoding engine 303 (utilized in step 205 of FIG. 2A) is responsible for decoding barcode 103 acquired via digital camera 107. Decoding engine 303 is designed to accommodate variations in brightness and contrast in the scanned image of barcode 103. This is done through use of globally and locally adaptive image processing operations. Exposure levels can be very high or very low, without significant adverse affect on success of decoding. If contrast is low either because the ink presents little contrast with the substrate, or because the lighting conditions are poor, decoding engine 303 may still decipher barcode 103. Even highly variable shading within an image is recognized and compensated for. The underlying technique utilized by decoding engine 303 to recognize features of barcode 103 is the detection of local pixel intensity patterns that may signal the presence of particular barcode features. This is in contrast to the approach of typical decode algorithms for more highly controlled commercial scanner or laser gun environments which typically do fixed thresholding or limited digital filtering which presumes a highly controlled environment and lighting configuration.

Decoding engine 303 is able to decode one and two dimensional barcodes with a CIF (typically 352×288) imager, and essentially all commonly used barcodes with a VGA (640×480) imager. Increasing the imager resolution generally improves the usability, decoding speed, and accuracy while increasing the range of viable barcodes.

In ordinary application usage, decoding engine 303 does not require special illumination sources due to its ability to decode barcodes from images with low contrast. For color imagers, decoding engine 303 utilizes specific image processing algorithms in order to avoid problematic image artifacts during the translation from color to grayscale. Decoding engine 303 utilizes fast image processing algorithms to perform the conversion so that the maximum amount of information is preserved, making for a robust, easy to use reader.

Decoding engine 303 is also able to cope with moderate amounts of image focus global impairment due to distance and lens focal length issues. Additionally, the decoding algorithm is optimized to work reliably even with appropriate low-cost lenses in inexpensive consumer cameras.

Decoding engine 303 is also designed to perform reliably in difficult decoding situations. It is successful in variable light, low contrast, low resolution, focus, and other impaired conditions. These abilities make decoding engine 303 perfectly suited to capture and decode barcode images in a variety of "real world" embedded digital camera device conditions.

More specifically, key technical decoding features used in decoding engine 303 include:

Rotation:

Decoding engine 303 enables identification and decoding of most barcodes at any degree of rotation from the normal orientation. Decoding engine 303 is designed for the more general "any orientation" case.

Geometric Distortions:

Decoding engine 303 is tolerant of "aspect ratio," "shear," "perspective," and other geometric image distortions. These distortions can be caused by a number of things such as the camera line of focus not being perpendicular to the plane of the barcode. Specific algorithms can tolerate deviations from the perpendicular in any direction.

Adaptive Correction:

One of the techniques used in several ways by decoding engine 303 is an adaptive, "multiple hypotheses" approach to detect the presence of specific features within barcode 103. In general, while decoding an image of barcode 103, a number of assumptions are made by decoding engine 303 about how characteristic features of barcode 103 are likely to appear in an image. For example, the precise width and intensity of a minimal bar in an image and the threshold at which a data bit in a matrix code is counted as on or off are critical to decoding an image. Initial default estimates of these parameters may be wrong, and only by adaptively correcting them can the image be decoded. Where appropriate, decoding engine 303 will re-examine an image that has failed to decode under one set of assumptions and introduce revised assumptions to improve the likelihood of correctly decoding barcode 103.

Error Correction:

Decoding engine 303 additionally makes use of sophisticated error correction technology for two-dimensional barcode formats. The standard technique for error correction in dense barcodes is some variant of a "Reed-Solomon" algorithm. Decoding engine 303 uses the full power of this approach. Reed-Solomon techniques can correct a limited number of errors in these guesses. Decoding engine 303 makes guesses on most elements, but also identifies elements that are too poorly imaged or printed to make a reasonable guess. These are "erasures." Reed-Solomon error correction techniques can detect and correct more errors and thus has improved general results when erasures are identified.

Sub-Pixel Precision:

Decoding engine 303 also allows barcode information to be resolved to sub-pixel precision. The algorithms need to, and can, with certain barcode types, retrieve information from a code element occupying an area less than 1.5×1.5 pixels. Among the techniques employed by decoding engine 303 are specialized adaptive interpolation algorithms that take into account the precise local conditions surrounding the data feature being examined. Local conditions may include differences in lighting or printing quality, or secondary light scattering. Various image kernel operations are available to enhance the local image quality. The resulting outcome is better decoding accuracy, support for higher density codes and more robust performance.

Decoding engine 303 may utilize any number of symbol libraries to resolve the correct barcode information. As shown, decoding engine 303 may access UPN-A/E library 307, RSS library 309, OI library 311, PDF417 library 313, QR code library 315, Code 39 library 317, Code 128 library 319, EAN library 321, and JAN library 323.

Finally, camera control module 305 operates in conjunction with API 301 to enable a user to take a photograph of barcode 103 with digital camera 107.

Figure 4A:
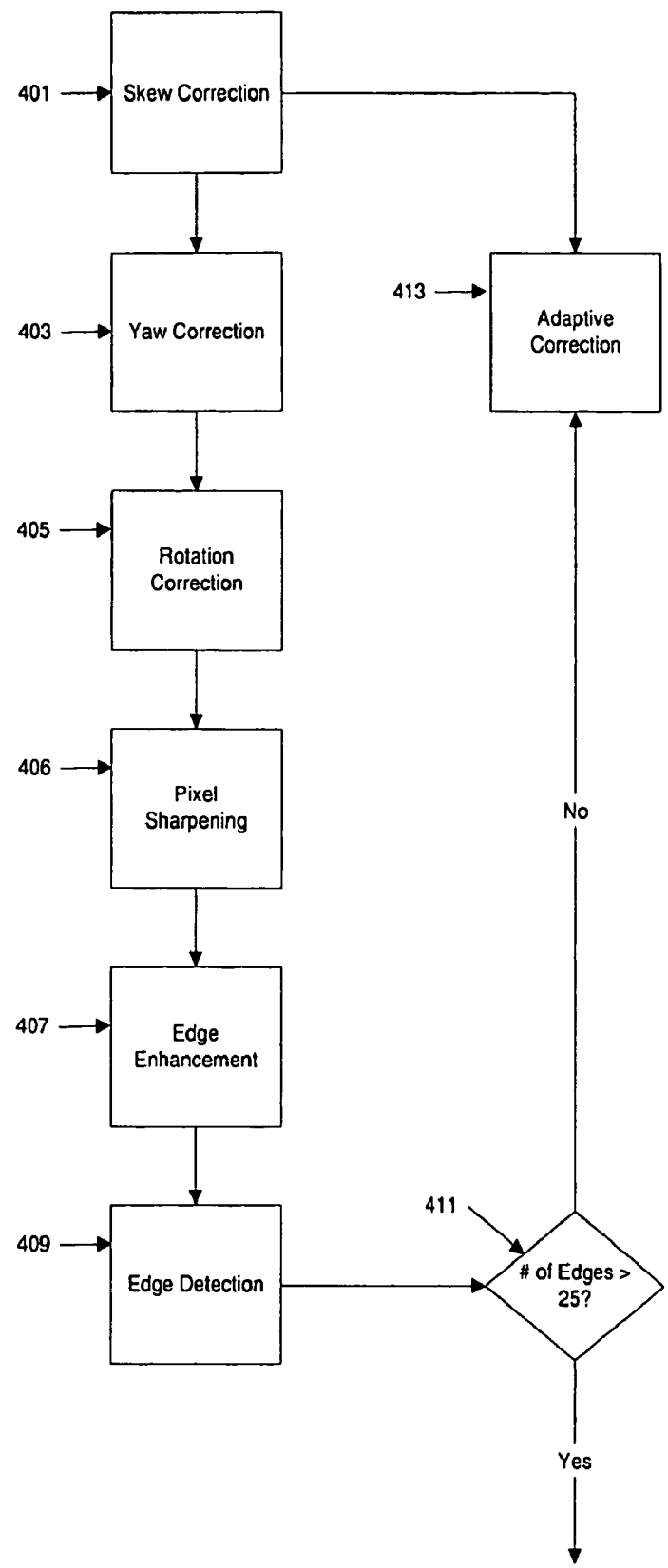
FIG. 4A depicts a flowchart showing the process utilized by the decoding engine to enhance an image before decoding.

Now referring to FIG. 4A, shown is a flowchart of the steps utilized by decoding engine 303 to enhance the image of barcode 103. Decoding engine 303 first attempts to de-skew the barcode image in step 401. Generally, skew occurs when the barcode picture is taken at an angle. To compensate for this effect, decoding engine 303 first identifies the angle(s) of skew in the image and processes the picture accordingly to remove the skew.

Next, decoding engine 303 attempts to repair images which exhibit yaw in step 403. Yaw occurs when the barcode or camera is moved during exposure, causing the image to exhibit streaks. Decoding engine 303 removes the yaw from images by using a filter specifically designed to remove such effects.

Once the skew and yaw in the image has been corrected, decoding engine 303 attempts to remove any rotation of the barcode from the normal orientation which may have occurred during imaging. This may be accomplished in a variety of ways in step 405. For example, decoding engine 303 may first identify the angle of rotation of the image. This is much simpler for one-dimensional barcodes, but is also possible for two-dimensional barcodes. For one-dimensional barcodes, decoding engine 303 only has to calculate the angle at which the parallel bars in the barcode are rotated from the normal orientation. Once this has been determined, decoding engine 303 can apply a rotation function to the image to return the barcode image to the normal orientation.

Returning two-dimensional barcodes to a normal orientation requires much more processing because two-dimensional barcodes contain data in both the horizontal and vertical directions. To determine the angle of rotation, the barcode must be analyzed from at least two orientations, preferably perpendicular to each other. The results of the two analyzations can then be utilized to determine the angle of rotation of the two-dimensional barcode. The same rotation function used for one-dimensional barcodes, previously described, can also be used for two-dimensional barcodes to return the barcode image to the normal orientation.

Figure 5A:
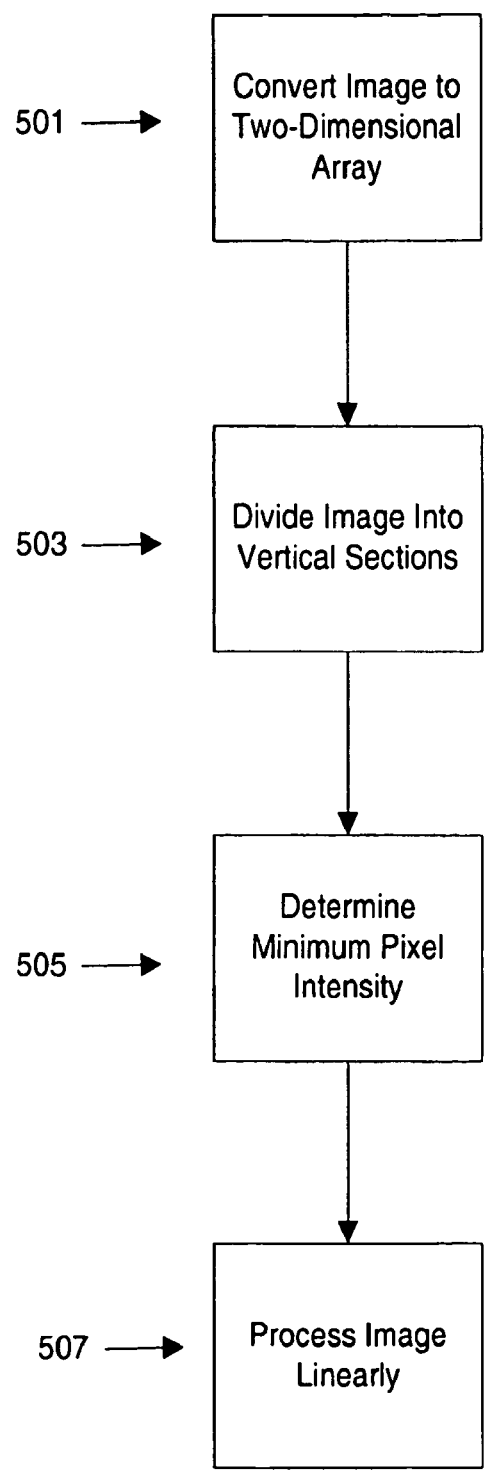
FIG. 5A depicts a flowchart showing the process utilized by the ScanZoom software to sharpen an image.

Next, decoding engine 303 sharpens the image using either a standard sharpening filter or a proprietary filter in step 406. The sharpening filter algorithm, described in FIG. 5A, has been shown to be effective for sharpening images containing barcodes. First, the sharpening algorithm converts the gray-scale barcode image is broken down into a two-dimensional array in step 501. Each entry in the two-dimensional array stores the horizontal and vertical coordinates (i.e., the "x" and "y" coordinates) of a single pixel. The image is then divided into an equal number of vertical sections in step 503. The number of sections ("ns") is equal to the width of the image (in pixels) divided by the desired width of the sections ("ws"). The width of the sections can either be user defined or automatically defined depending upon the size of the image. This converts the image to a three-dimensional array since each pixel also has an assigned section.

After the image has been divided into sections, the sharpening algorithm determines the minimum intensity of a pixel in each section in step 505. The image is then processed linearly section by section in step 507. This is done by assigning a pixel intensity of zero to all pixel intensities which are below a threshold black level. The threshold black level is user-defined and may be changed for each image or section being processed. In contrast, all pixel intensities having a pixel value above a threshold white value are assigned a pixel intensity of 255.

A pixel is also assigned a zero intensity if:

1. The value of the pixel lies within a predetermined range of the minimum pixel intensity for that section; or
2. The intensity of pixels surrounding a certain pixel has an intensity that lies within the predetermined range of minimum pixel intensity for that section.

Figure 5B:
FIG. 5B depicts a typical barcode image acquired using a digital camera.
Figure 5C:
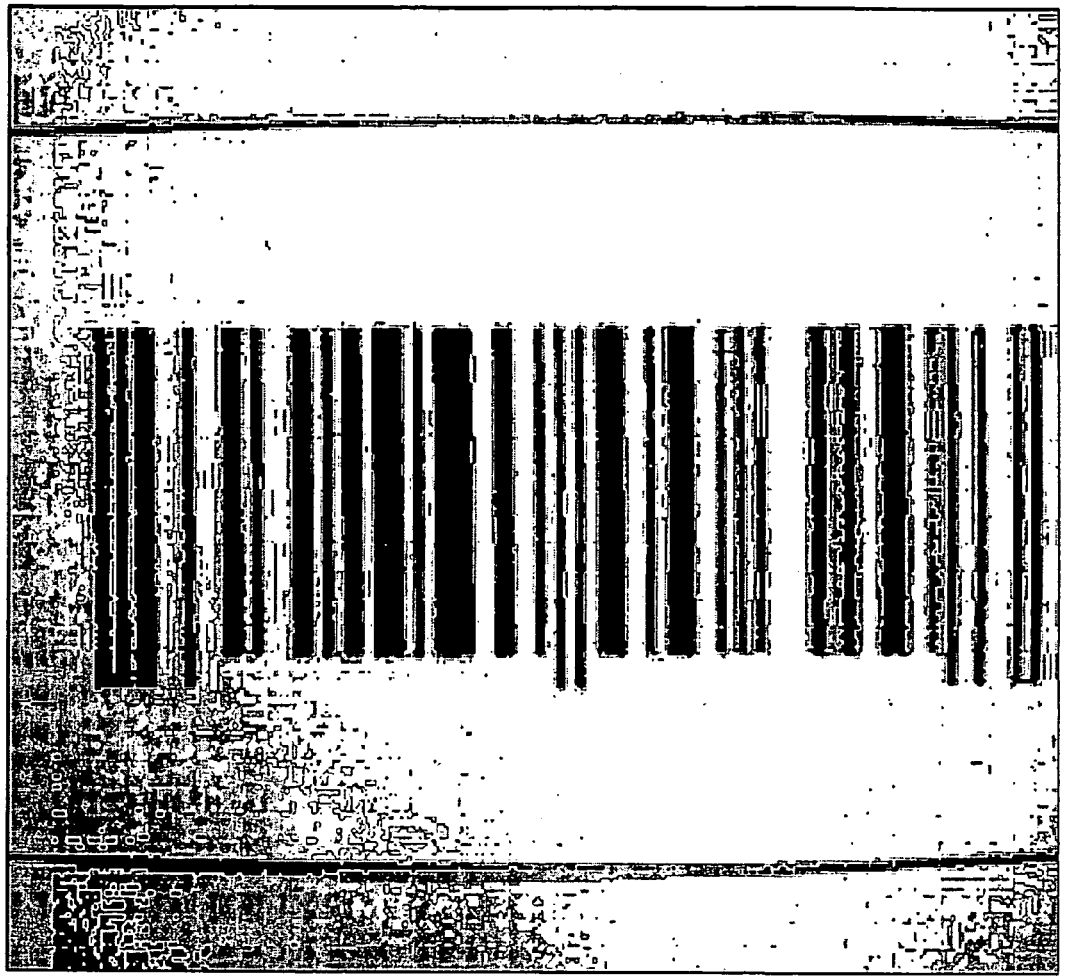
FIG. 5C depicts the barcode of FIG. 5B after it has undergone sharpening utilizing the sharpening filter depicted in FIG. 5A.

After the image of the barcode has been processed in step 507, the sharpening algorithm renders the processed image sections back into an image. An example input and output barcode which have been processed by the aforementioned sharpening algorithm are shown in FIG. 5B and FIG. 5C, respectively. The outputted image of FIG. 5C has a much higher chance of being properly decoded than the inputted image of FIG. 5B.

Now referring back to FIG. 4A, decoding engine 303 applies an edge enhancement filter to the image in step 407. This further removes any image anomalies which may have occurred during imaging or conversion to black and white. Once the edges are enhanced, decoding engine 303 counts the number of edges which occur in the barcode image in step 409. An edge is a point in the image where there is a sudden change in the color values of the image. An edge that defines a transition from white to black (light to dark) is called a rising edge and an edge that defines the transition from black to white (dark to light) is called a falling edge. Since the quality of the image returned by the camera of the cell phone isn't of a very good quality, the edge detection process relies on the series of approximations and sub processes. Thus the edge detection of step 409 returns a collection of edges (i.e., points where it is believed that the value of the color changed from dark to light or light to dark).

If the number of detected edges is less than 25 as checked in step 411, decoding algorithm 303 attempts to adjust the barcode image again using a new set of assumptions in step 413. The image is then reprocessed using an unaltered version of the image stored in a buffer. If more than 25 edges are not detected after a number of iterations, the ScanZoom application informs the user that a barcode could not be located and the application terminates.

Figure 4B:
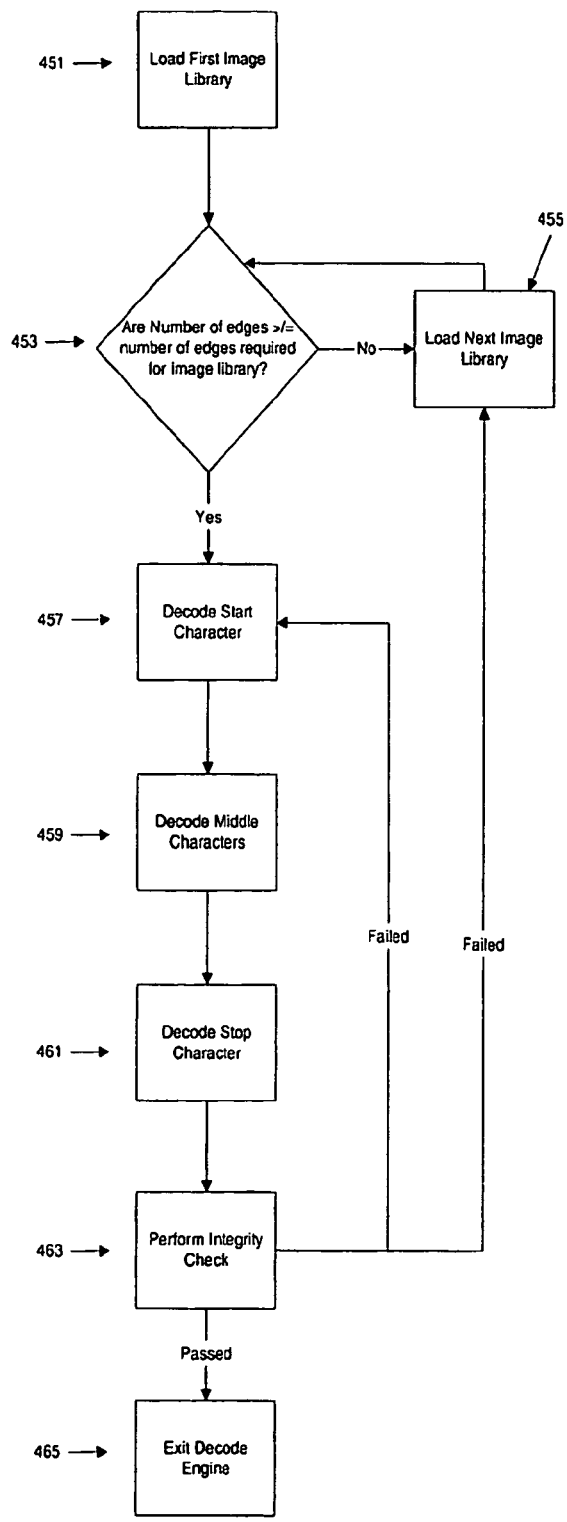
FIG. 4B depicts a flowchart showing the process utilized by the decoding engine to decode a barcode.

However, if the number of edges if found to be greater than or equal to 25, decoding engine 303 advances to the flowchart of FIG. 4B. As shown in the flowchart, decoding engine 303 loads a first symbology library in step 451. The symbology library may be UPN-A/E library 307, RSS library 309, OI library 311, PDF417 library 313, QR code library 315, Code 39 library 317, Code 128 library 319, EAN library 321, and JAN library 323 (see FIG. 3A). Decoding engine then compares the number of edges a barcode needs to be in this library to the number of edges detected in the actual scanned barcode in step 453. If the number of edges does not match, decoding engine 303 loads the next symbology library in step 455 and repeats the edge comparison with the new library. Detection engine 303 continues this comparison until a match is found.

When a match is found in step 453, detection engine 303 proceeds to decode the start character of the barcode from the barcode image in step 457. Typically, the first character in a barcode indicates the use of the code. For example, in UPC codes, if the start character is a six, it indicates that it the barcode is a standard UPC code. Detection engine 303 then decodes the middle characters of the barcode in step 459 and the stop character of the barcode in step 461.

Each barcode font relies on static tables of values to decode each character. These tables are designed using the bit patterns in the barcode font's specification. Each barcode consists of both dark and light elements. The combination of the dark and light elements and their thickness decides the value of the character. The difference of two consecutive edges provides the width of an element. The widths of the elements are then converted into bit patterns and mapped against the static tables to derive the character value. If a good value is returned then the next set of edges is passed. A bad value signifies that the barcode character could not be decoded.

In many barcode formats, the stop character is used as a check digit to ensure that the barcode has been decoded correctly. Detection engine 303 performs such an integrity check in step 463. If the integrity check fails, detection engine either loads another symbology library in step 455 or attempts to re-decode the image in step 457. If the integrity check is passed in step 463, decoding engine 303 is terminated in step 465 and the barcode data is forwarded to the messaging system (see FIG. 2A, step 209).

While the foregoing embodiments of the invention have been set forth in considerable detail for the purposes of making a complete disclosure, it should be evident to one skilled in the art that multiple changes may be made to the aforementioned description without departing from the spirit of the invention.

What is claimed is:

1. A method for decoding a barcode comprising:
   (a) imaging the barcode with a mobile device equipped with a digital camera;
   (b) converting the barcode image to an array of pixels;
   (c) dividing the array of pixels into sections;
   (d) selecting a section;
   (e) determining a minimal pixel intensity for the selected section;
   (f) assigning a high pixel intensity to pixels with intensities above a threshold white level intensity;
   (g) assigning a zero pixel intensity to pixels with intensities below a threshold black level intensity;
   (h) assigning a zero pixel intensity to pixels with intensities within a range of the minimal pixel intensity of the selected section;
   (i) assigning a zero pixel intensity to pixels that are adjacent to a pixel that has an intensity within a range of the minimal pixel intensity of the selected section;
   (j) repeating (d)-(i) for each of the sections;
   (k) rendering the sections to form an enhanced barcode image;
   (l) decoding the enhanced barcode image to obtain barcode information;
   (m) transmitting the barcode information from the mobile device to a server, the mobile device in communication with the server through a wireless network; and
   (n) receiving a message associated with the barcode information from the server through the wireless network.

2. A method for decoding a barcode according to claim 1, wherein
   the high pixel intensity is 255; and the threshold black level intensity being user defined for each section.

3. A method for decoding a barcode according to claim 1, further comprising:
calculating the number of edges in the enhanced barcode image; and
if the number of edges in the enhanced barcode image meets a threshold required for a first symbology library, decoding the enhanced barcode image using the first symbology library.

4. A method for decoding a barcode according to claim 3, further comprising:
if the number of edges in the enhanced barcode image meets a threshold required for a second symbology library, decoding the enhanced barcode image using the second symbology library.

5. A method for decoding a barcode according to claim 1, wherein the mobile device is at least one of a camera phone, a mobile phone, a smart phone, a PDA, a pager, a pocket PC, and a laptop computer.

6. A method for decoding a barcode according to claim 1, wherein the barcode is constructed from at least one of the standardized barcode symbology libraries comprising UPC-A, UC-E, ISBN, RSS-14, RSS-14E, RSS-14L, Interleaved 2 of 5, EAN/JAN-8, EAN/JAN-13, Code 3, Code 39 Full ASCII, Code 128, PDF417, QR Code, or Data Matrix.

7. A method for decoding a barcode according to claim 1, wherein the message is a search result of a database and wherein the search is constructed from the barcode information.

8. A method for decoding a barcode according to claim 1, wherein the message is product information.

9. A method for decoding a barcode according to claim 1, wherein the message is media content.

10. A method for decoding a barcode according to claim 1, further comprising performing a function based at least in part on the message.

11. A method for decoding a barcode according to claim 1, further comprising launching a WAP browser based at least in part on the message.

12. A method for decoding a barcode according to claim 1, wherein the sections are vertical sections.

13. A method for decoding a barcode according to claim 1, wherein the sections are horizontal sections.

14. A method for decoding a barcode according to claim 1, wherein the wireless network is a WAP network.

15. A method for decoding a barcode according to claim 1, wherein the barcode information is transmitted to the server via an SMS message.

16. A method for decoding a barcode according to claim 1, wherein the barcode information is transmitted to the server via an MMS message.

17. A mobile device that decodes barcodes, comprising:
an interface in communication with a wireless network;
a memory;
a digital camera; and
a processor in communication with the memory, the interface, and the digital camera;
wherein in the processor:
(a) images the barcode with a mobile device equipped with a digital camera;
(b) converts the barcode image to an array of pixels;
(c) divides the array of pixels into sections;
(d) selects a section;
(e) determines a minimal pixel intensity for the selected section;
(f) assigns a high pixel intensity to pixels with intensities above a threshold white level intensity;
(g) assigns a zero pixel intensity to pixels with intensities below a threshold black level intensity;
(h) assigns a zero pixel intensity to pixels with intensities within a range of the minimal pixel intensity of the selected section;
(i) assigns a zero pixel intensity to pixels that are adjacent to a pixel that has an intensity within a range of the minimal pixel intensity of the selected section;
(j) repeats (d)-(i) for each of the sections;
(k) renders the sections to form an enhanced barcode image;
(l) decodes the enhanced barcode image to obtain barcode information;
(m) transmits the barcode information from the mobile device to a server, the mobile device in communication with the server through a wireless network; and
(n) receives a message associated with the barcode information from the server through the wireless network.

18. The mobile device of claim 17, wherein
the high pixel intensity is 255; and
the threshold black level intensity being user defined for each section.

19. The mobile device of claim 17, wherein the processor further
calculates the number of edges in the enhanced barcode image;
if the number of edges in the enhanced barcode image meets a threshold required for a first symbology library, decodes the enhanced barcode image using the first symbology library.

20. The mobile device of claim 19, wherein the processor further,
if the number of edges in the enhanced barcode image meets a threshold required for a second symbology library, decodes the enhanced barcode image using a second symbology library.

21. The mobile device of claim 17, wherein the mobile device is at least one of a camera phone, a mobile phone, a smart phone, a PDA, a pager, a pocket PC, and a laptop computer.

22. The mobile device of claim 17, wherein the barcode is constructed from at least one of the standardized barcode symbology libraries comprising UPC-A, UC-E, ISBN, RSS-14, RSS-14E, RSS-14L, Interleaved 2 of 5, EAN/JAN-8, EAN/JAN-13, Code 3, Code 39 Full ASCII, Code 128, PDF417, QR Code, or Data Matrix.

23. The mobile device of claim 17, wherein the message is a search result of a database and wherein the search is constructed from the barcode information.

24. The mobile device of claim 17, wherein the message is product information.

25. The mobile device of claim 17, wherein the message is media content.

26. The mobile device of claim 17, wherein the processor further performs a function based at least in part on the message.

27. The mobile device of claim 17, wherein the processor further launches a WAP browser based at least in part on the message.

28. The mobile device of claim 17, wherein the sections are vertical sections.

29. The mobile device of claim 17, wherein the sections are horizontal sections.

30. The mobile device of claim 17, wherein the wireless network is a WAP network.

31. The mobile device of claim 17, wherein the barcode information is transmitted to the server via an SMS message.

32. The mobile device of claim 17, wherein the barcode information is transmitted to the server via an MMS message.

33. A computer-readable medium containing computer-executable instructions that, when executed by a processor, cause the processor to perform a method for decoding a barcode, comprising:
 (a) imaging the barcode with a mobile device equipped with a digital camera;
 (b) converting the barcode image to an array of pixels;
 (c) dividing the array of pixels into sections;
 (d) selecting a section;
 (e) determining a minimal pixel intensity for the selected section;
 (f) assigning a high pixel intensity to pixels with intensities above a threshold white level intensity;
 (g) assigning a zero pixel intensity to pixels with intensities below a threshold black level intensity;
 (h) assigning a zero pixel intensity to pixels with intensities within a range of the minimal pixel intensity of the selected section;
 (i) assigning a zero pixel intensity to pixels that are adjacent to a pixel that has an intensity within a range of the minimal pixel intensity of the selected section;
 (j) repeating (d)-(i) for each of the sections;
 (k) rendering the sections to form an enhanced barcode image;
 (l) decoding the enhanced barcode image to obtain barcode information;
 (m) transmitting the barcode information from the mobile device to a server, the mobile device in communication with the server through a wireless network; and
 (n) receiving a message associated with the barcode information from the server through the wireless network.

* * * * *